United States Patent
Ishizu et al.

(10) Patent No.: US 7,123,645 B2
(45) Date of Patent: Oct. 17, 2006

(54) SPREAD-SPECTRUM SIGNAL RECEIVER

(75) Inventors: Eizou Ishizu, Kawasaki (JP); Tadashi Nakamura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 997 days.

(21) Appl. No.: 09/769,884

(22) Filed: Jan. 25, 2001

(65) Prior Publication Data
US 2002/0015438 A1  Feb. 7, 2002

(30) Foreign Application Priority Data
Aug. 7, 2000  (JP) ............................. 2000-238052

(51) Int. Cl.
*H04K 1/00* (2006.01)
(52) U.S. Cl. ...................... 375/147; 375/148; 370/342
(58) Field of Classification Search ................ 375/147, 375/148; 370/342, 335
See application file for complete search history.

(56) References Cited

U.S. PATENT DOCUMENTS 6,331,975 B1 * 12/2001 Hosur et al. ............... 370/342
6,473,451 B1 * 10/2002 Seki et al. .................. 375/142

FOREIGN PATENT DOCUMENTS

JP  09284205  10/1997

* cited by examiner

*Primary Examiner*—Temesghen Ghebretinsae
(74) *Attorney, Agent, or Firm*—Katten Muchin Rosenman LLP (57) ABSTRACT

A CDMA receiver is disclosed wherein (1) a despreader despreads a receive signal to thereby demodulate a control-data signal and a transmit-data signal; (2) a channel estimation unit derives a channel estimation value from a pilot signal that is contained in the despread control-data signal; (3) a channel compensation unit performs channel compensation of the transmit-data and control-data signals based upon the channel estimation value; (4) a power calculation unit calculates power of the transmit-data signal and power of the control-data signal after the channel compensation thereof and calculates a power ratio representing the ratio of the calculated power of the transmit-data signal to the calculated power of the control-data signal; (5) a signal-level changing unit raises, on the basis of the power ratio, the level of whichever of the signals has the lower power; and (6) a decoder executes decoding processing based upon the signal the level of which has been changed by the signal-level changing unit.

4 Claims, 12 Drawing Sheets

| POWER RATIO | WEIGHTING COEFFICIENT FOR CONTROL CHANNEL (RC2) | WEIGHTING COEFFICIENT FOR DATA CHANNEL (RC1) |
| --- | --- | --- |
| LESS THAN 1/4 | 0.9 | 0.7 |
| EQUAL TO OR GREATER THAN 1/4 AND LESS THAN 2/4 | 0.875 | 0.725 |
| EQUAL TO OR GREATER THAN 2/4 AND LESS THAN 3/4 | 0.85 | 0.75 |
| EQUAL TO OR GREATER THAN 3/4 AND LESS THAN 1 | 0.825 | 0.775 |
| EQUAL TO OR GREATER THAN 1 AND LESS THAN 5/4 | 0.8 | 0.8 |
| EQUAL TO OR GREATER THAN 5/4 AND LESS THAN 6/4 | 0.775 | 0.825 |
| EQUAL TO OR GREATER THAN 6/4 AND LESS THAN 7/4 | 0.75 | 0.85 |
| EQUAL TO OR GREATER THAN 7/4 AND LESS THAN 2 | 0.725 | 0.875 |
| EQUAL TO OR GREATER THAN 2 | 0.7 | 0.9 |

FIG. 8

| POWER RATIO $P_d/P_c$ | WEIGHTING COEFFICIENT RC |
| --- | --- |
| LESS THAN 1/4 | 0.3 |
| EQUAL TO OR GREATER THAN 1/4 AND LESS THAN 2/4 | 0.425 |
| EQUAL TO OR GREATER THAN 2/4 AND LESS THAN 3/4 | 0.45 |
| EQUAL TO OR GREATER THAN 3/4 AND LESS THAN 1 | 0.475 |
| EQUAL TO OR GREATER THAN 1 AND LESS THAN 5/4 | 0.5 |
| EQUAL TO OR GREATER THAN 5/4 AND LESS THAN 6/4 | 0.625 |
| EQUAL TO OR GREATER THAN 6/4 AND LESS THAN 7/4 | 0.65 |
| EQUAL TO OR GREATER THAN 7/4 AND LESS THAN 2 | 0.675 |
| EQUAL TO OR GREATER THAN 2 | 0.7 |

FIG. 14 PRIOR ART

SPREAD-SPECTRUM SIGNAL RECEIVER

BACKGROUND OF THE INVENTION

This invention relates to a spread-spectrum signal receiver for receiving a signal (referred to as a spread-spectrum signal) that has been spread by a direct-sequence (DS) scheme. More particularly, the invention relates to a spread-spectrum signal receiver for receiving a spread-spectrum signal obtained by rendering transmit data and control data, which have been modulated at different powers, into signals that do not influence each other, e.g., signals that are mutually orthogonal, multiplexing these signals and transmitting the multiplexed signal from a transmit side.

In spread-spectrum communications, W-CDMA (Wideband Code Division Multiple Access), which employs direct-sequence spreading, is one of the third-generation mobile communications systems the standardization of which is being forwarded by the 3GPP ($3^{rd}$ Generation Partnership Project).

Figure 9:
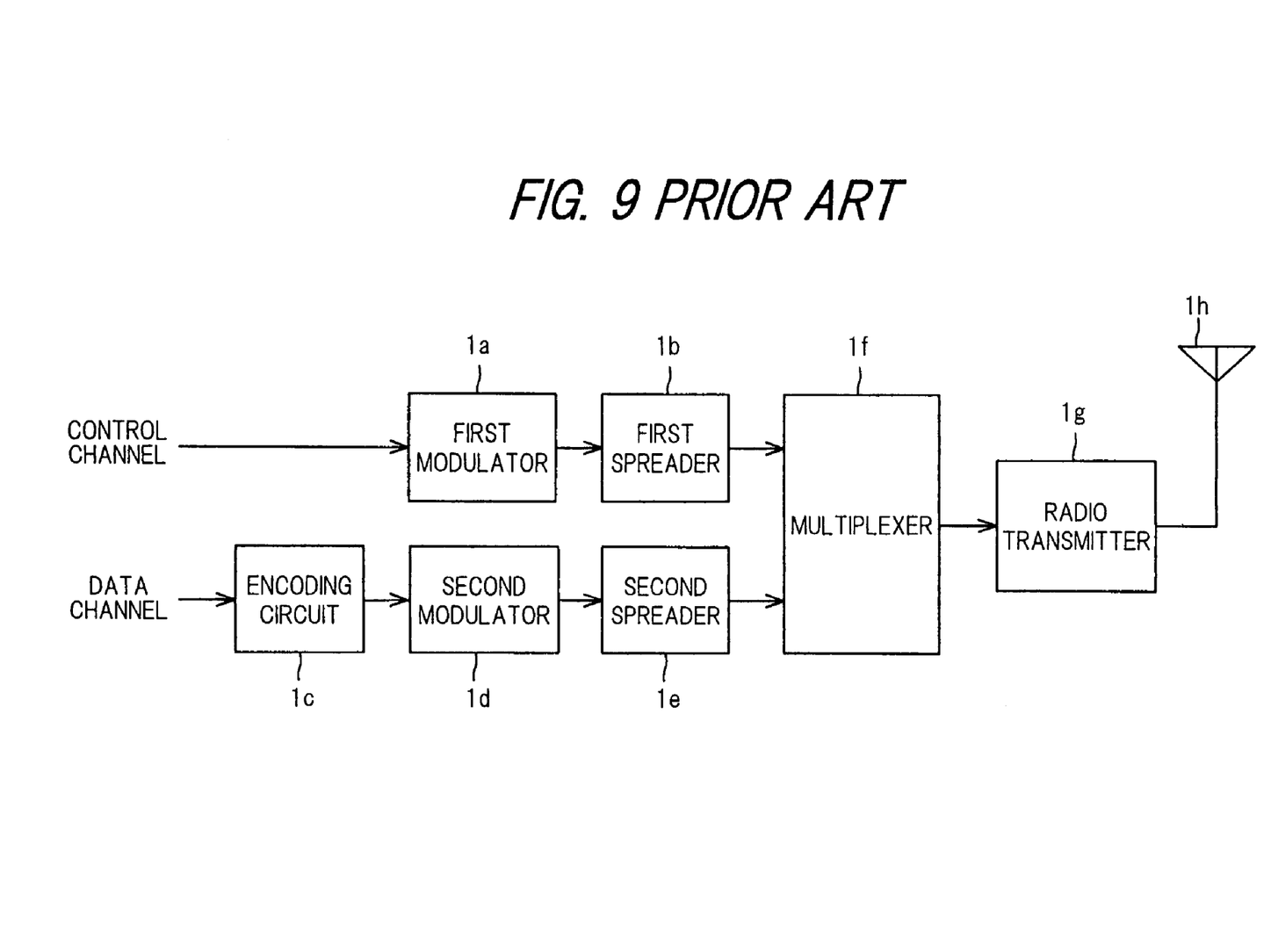
FIG. 9 is a block diagram of a CDMA transmitter in a mobile station according to the prior art.
Figure 10:
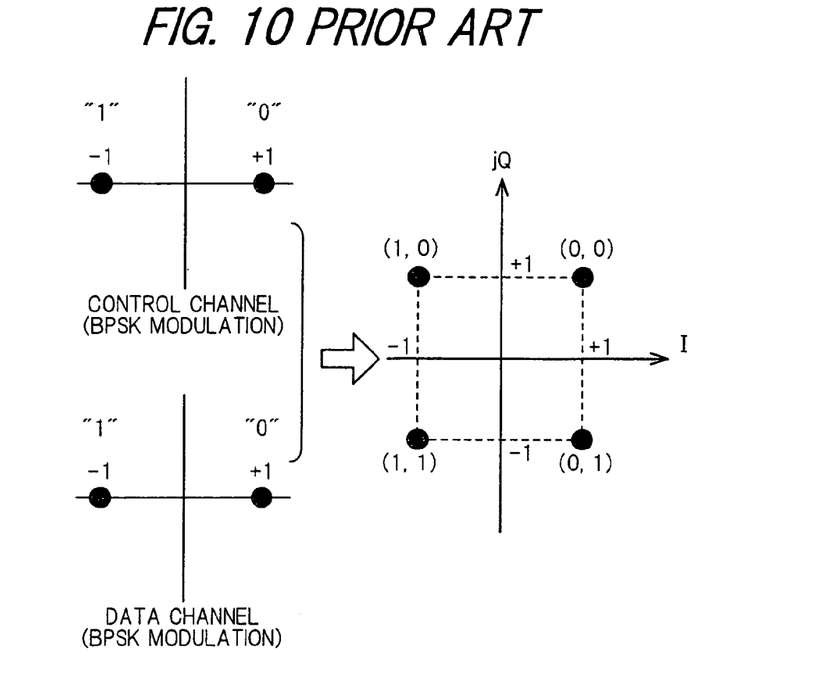
FIG. 10 is a diagram useful in describing BPSK modulation and mapping to an I-Q complex plane according to the prior art.

With CDMA, as shown in FIG. 9, a mobile station, which is a spread-spectrum signal transceiver, has a first modulator 1a for applying BPSK modulation (see FIG. 10) to control data that includes pilot data, and a first spreader 1b for applying spread-spectrum modulation using a spreading code for the control data. The mobile station further includes an encoding circuit 1c for subjecting the transmit data to suitable encoding such as convolutional coding a second modulator 1d for subsequently applying BSPK modulation and a second spreader 1e for spreading the resultant signal using a spreading code for the transmit data. The mobile station further includes a multiplexer 1f for mapping the control data and transmit data, which have been spreaded by the first and second spreaders, as an I-axis component (I-channel component) and Q-axis component (Q-channel component) of an I-Q complex plane, as illustrated on the right side of FIG. 10, and multiplexing the resulting signals, and a radio transmitter unit 1g for subjecting the multiplexed signal to frequency conversion and high-frequency amplification and transmitting the resulting signal from an antenna 1h. It should be noted that the I and Q channels are referred to also as data and control channels, respectively.

Figure 11:
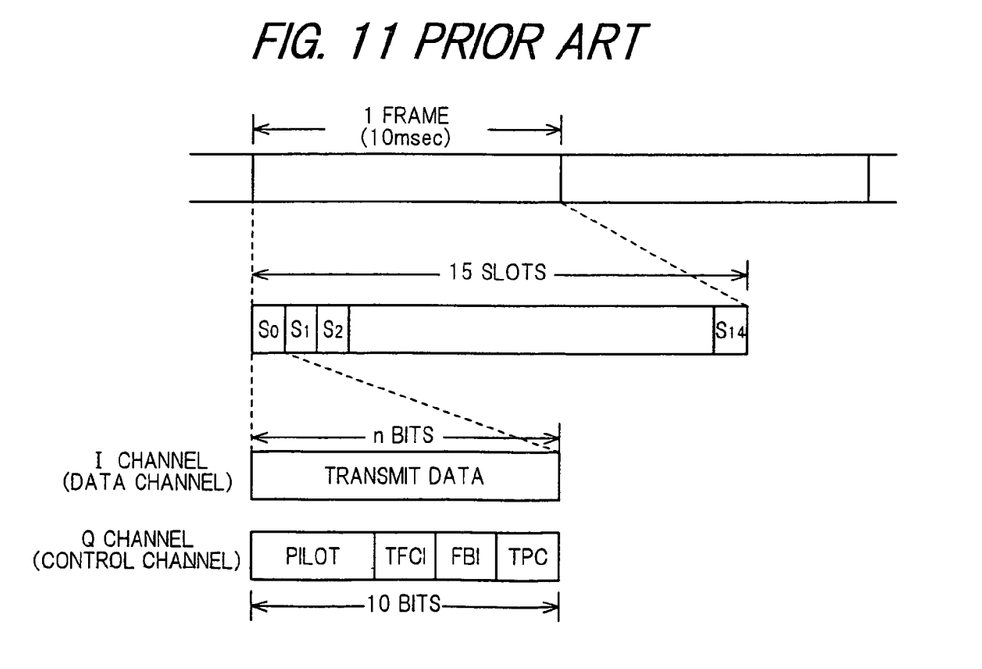
FIG. 11 illustrates the frame format of an uplink frame according to the prior art.

An uplink signal from the mobile station to a base station has a frame format shown in FIG. 11. One frame has a duration of 10 ms and is composed of 15 slots $S_0$ to $S_{14}$. Transmit data is mapped to the I channel (data channel) and control data, which is data other than the transmit data, is mapped to the Q channel (control channel). Each of the slots $S_0$ to $S_{14}$ of the data channel that transmits the transmit data is composed of n bits, where n varies depending upon symbol rate. The symbol rate will be 7.5 ($=5 \times 15/10 \times 10^{-3}$) kbps if n=5 holds; 15 ($=10 \times 15/10 \times 10^{-3}$) kbps if n=10 holds; 30 kbps if n=20 holds, and so forth.

Each slot of the control channel that transmits the control data is composed of 10 bits, and the symbol rate is a constant 15 kbps. Each slot transmits a pilot, transmission-power control data TPC, a transport format combination indicator TFCI and feedback information FBI. The pilot is utilized on the receive side for coherent detection and SIR (Signal to Interference Ratio) measurement, the TPC is utilized for control of transmission power, the TFCI transmits the symbol rate of the data and the number of bits per frame, etc., and the FBI is for controlling transmission diversity at the base station.

Thus, there are instances where the symbol rates on the data and control channels differ. In such case the spreading factor [=(symbol rate)/(chip rate)] on the data channel differs from that on the control channel. For example, (1) if the symbol rate of the data channel is lower than that (15 kbps) of the control channel, then the spreading factor of the data channel will be larger than that of the control channel, and (2) if the symbol rate of the data channel is higher than that (15 kbps) of the control channel, then the spreading factor of the data channel will be smaller than that of the control channel. The larger the spreading factor, the higher the process gain. Accordingly, in a W-CDMA system, transmission power for which the spreading factor is larger is reduced to lower the total transmission power. In other words, with W-CDMA, the control and data channels are subjected to BPSK and spread-spectrum modulation at powers that differ from each other, the spread-spectrum modulated signals are mapped on an I-Q complex plane and multiplexed and the multiplexed signal is transmitted.

Figure 12:
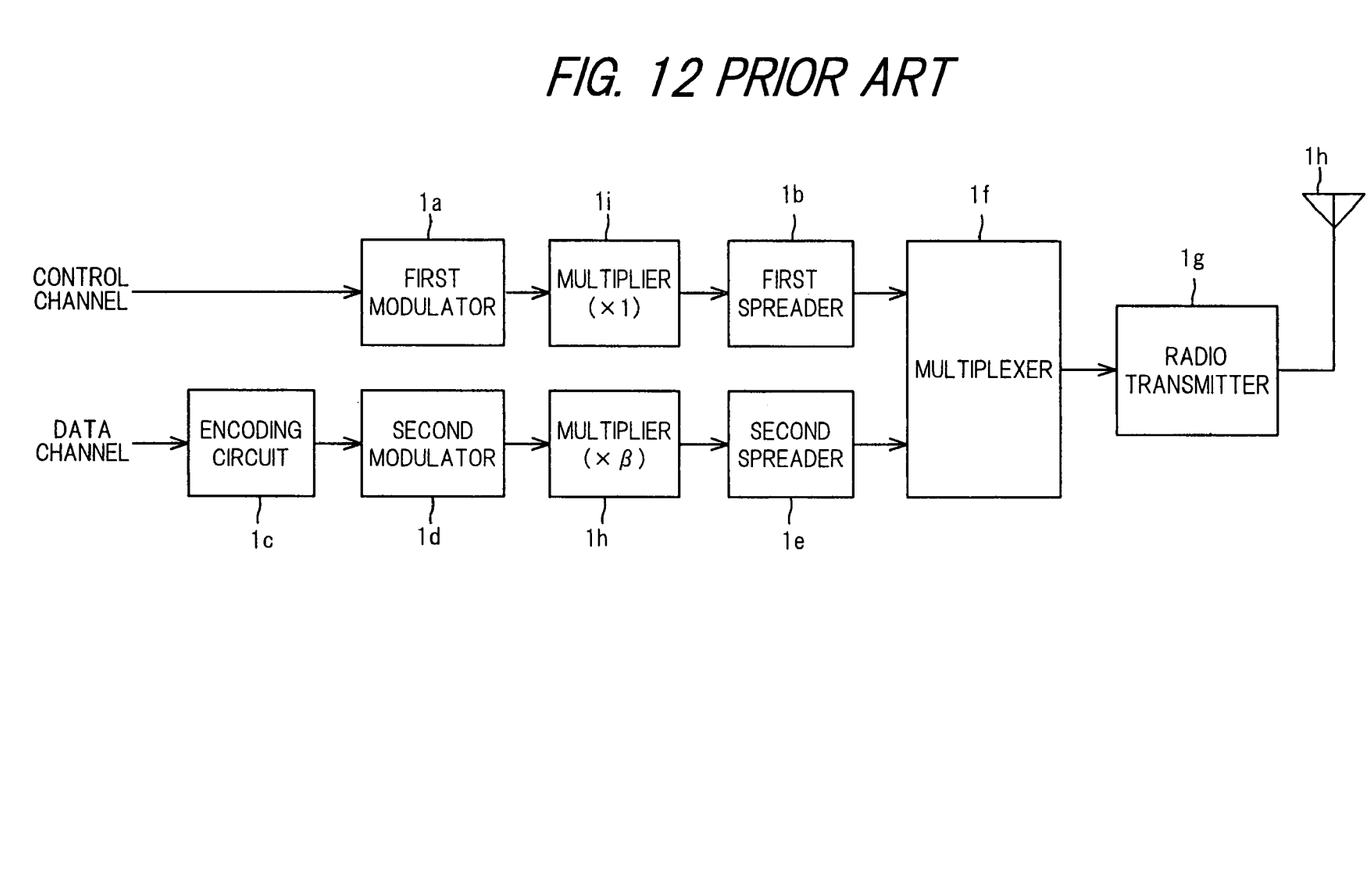
FIG. 12 is a block diagram showing the transmitter section of a mobile station in W-CDMA according to the prior art.
Figure 13A:
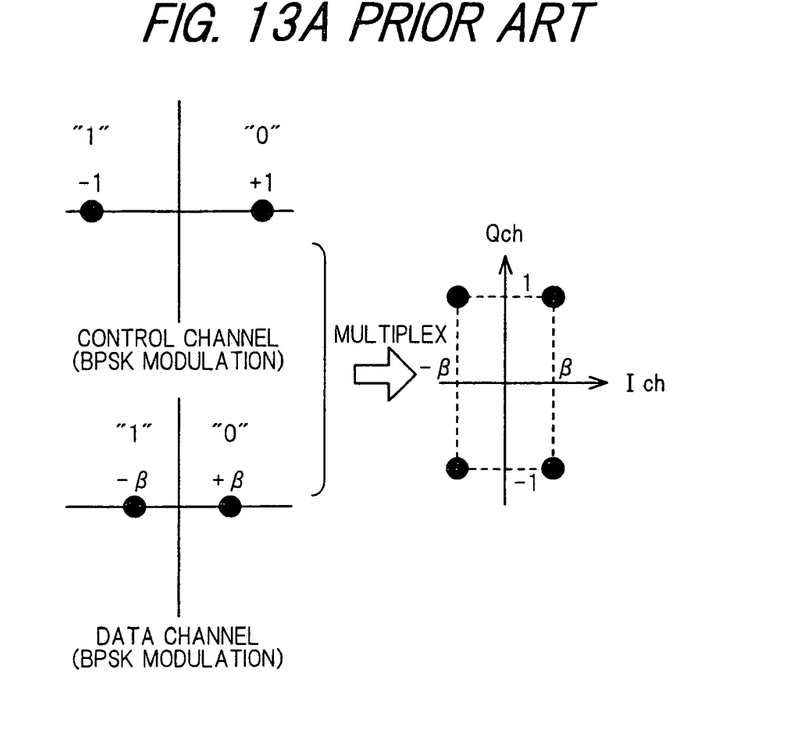
FIGS. 13A, 13B are diagrams useful in describing multiplexed signals in a complex plane according to the prior art.

If, by way of example, the spreading factor of the data channel is larger than that of the control channel, then, as shown in FIG. 12, the apparatus of FIG. 9 is further provided with multipliers 1h, 1i, the multiplier 1h multiplies the BPSK modulation output of the second modulator 1d of the data channel by β (β<1) and the multiplier 1i multiplies the BPSK modulation output of the first modulator 1a of the control channel by 1 (i.e., leaves this output unchanged). The first and second spreaders 1b, 1e thenceforth spread-spectrum modulate the outputs of the multipliers 1i, 1h, respectively, the multiplexer 1f maps the spread-spectrum modulated signals of the respective channels on the I-Q complex plane, as illustrated in FIG. 13A, and multiplexes the resultant signals, and the radio transmitter unit 1g subjects the multiplexed signal to a frequency conversion and high-frequency amplification and transmits the resulting signal from the antenna 1h. By thus lowering the transmission power of the channel having the larger spreading factor, the total transmission power can be controlled (reduced).

Figure 13B:
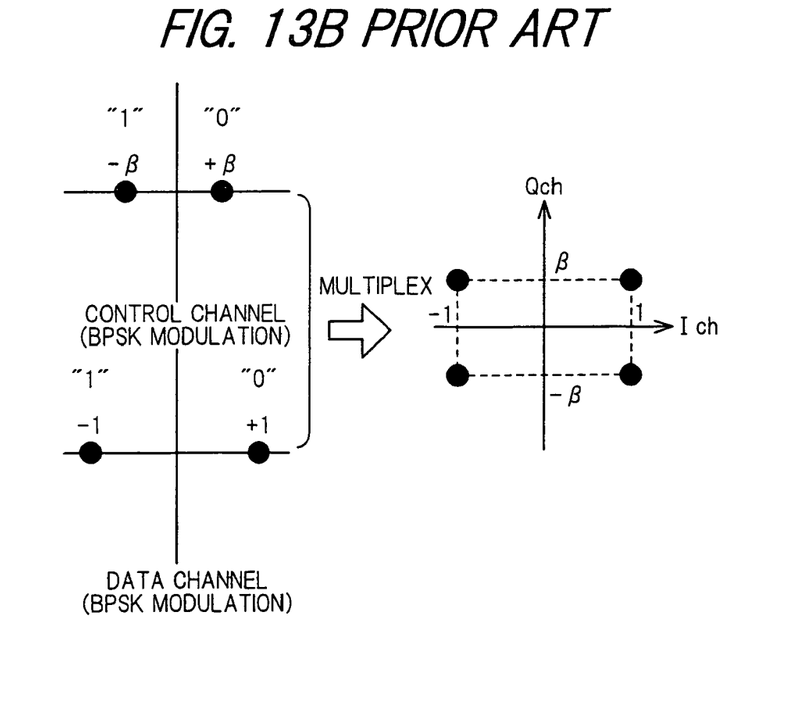

Further, if the spreading factor of the data channel is made smaller than that of the control channel, the multiplier 1h multiplies the BPSK modulation output of the second modulator 1d by 1 and the multiplier 1i multiplies the BPSK modulation output of the first modulator 1a by β (β<1). The multiplexer 1f maps the spread-spectrum modulated signals of the respective channels on the I-Q complex plane, as illustrated in FIG. 13B, and multiplexes the resulting signals. As a result, the total transmission power can be reduced by lowering the transmission power of the channel having the larger spreading factor.

Figure 14:
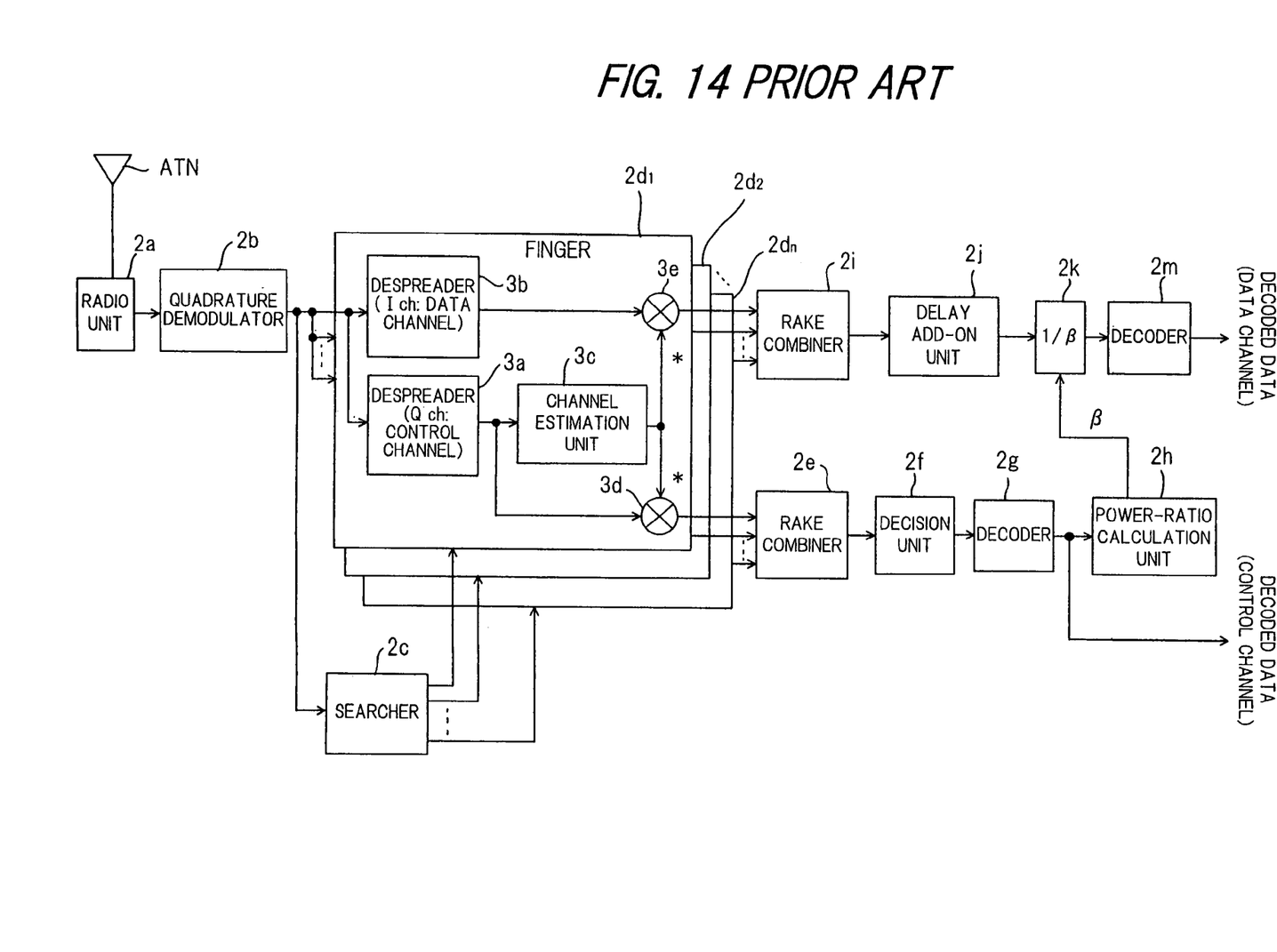
FIG. 14 is a block diagram illustrating one channel of a CDMA receiver section in the CDMA receiver of a base station.

FIG. 14 is a block diagram illustrating one channel of the receiver section of a base station, which is a spread-spectrum signal transceiver. The base station has a radio unit 2a for frequency-converting a high-frequency signal received from an antenna ATN to a baseband signal; a quadrature demodulator 2b for subjecting the baseband signal to quadrature detection, converting the analog in-phase component (I component) and analog quadrature component (Q component) to digital data and inputting the data to a searcher 2c and fingers $2d_1$~$2d_n$. Upon receiving input of a direct-sequence signal (DS signal) that has been influenced by the multipath effect, the searcher 2C detects multipath interference by performing an autocorrelation operation using a matched filter and inputs despreading-start timing data and delay-time adjustment data of each path to the fingers $2d_1$~$2d_n$. A control-channel despreader 3a of each of the fingers $2d_1$~$2d_n$ subjects a direct wave or delayed wave that arrives via a prescribed path to despread processing using a code identical with the spreading code for the control channel, integrates the results of despreading, then applies delay processing that conforms to the path and outputs a control-data signal. A data-channel despreader 3b subjects a direct wave or delayed wave that arrives via a prescribed path to despread processing using a code identical with the spreading code for the data channel, integrates the results of despreading, then applies delay processing that conforms to the path and outputs a transmit-data signal.

A channel estimation unit 3c estimates the phasing characteristic of the propagation path using the pilot signal contained in the despread control-data signal, executes channel estimation which compensates for the effects of phasing, and outputs a channel estimation signal. Channel compensation units 3d, 3e multiply the despread control-data signal and despread transmit-data signal by the complex-conjugate signal of the channel estimation signal to thereby compensate for phasing. A RAKE combiner 2e combines the control-data signals output from the fingers $2d_1 \sim 2d_n$ and outputs the result as a soft-decision data sequence. A decision unit 2f renders the soft-decision data into hard decision data, and a decoder 2g applies error-correction decoding processing to the hard-decision data, which is output from the decision unit 2f, decodes the control data that prevailed prior to encoding and outputs the decoded data. It should be noted that the soft-decision data, rather than being made hard-decision data by the decision unit 2f, can be subjected to soft-decision error-correction processing by the decoder 2g as is, whereby the control data is decoded and output. A power-ratio calculation unit 2h calculates the ratio (Pd/Pc=$\beta^2$) of data-channel signal power Pd to control-channel signal power Pc from the rate information (symbol rate of the data) included in the TFCI bit of the control data and outputs $\beta$.

A RAKE combiner 2i combines the control-data signals output from the fingers $2d_1 \sim 2d_n$ and outputs the result as a soft-decision data sequence. A delay add-on unit 2j performs a time adjustment by delaying the soft-decision data sequence long enough for the calculation of the power ratio. A signal level changing unit 2k multiplies the soft-decision data level of the data channel by 1/$\beta$ (the level of the transmit-data signal is multiplied by $\beta$ on the transmit side) and then renders the data into hard decision data. A decoder 2m applies error-correction decoding processing to the hard-decision data, which is output from the signal level changing unit 2k, decodes the transmit data that prevailed prior to encoding and outputs the decoded data. It should be noted that the soft-decision data that has been multiplied by 1/$\beta$, rather than being made hard-decision data by the signal level changing unit 2k, can be subjected to soft-decision error-correction processing by the decoder 2m as is, whereby the transmit data is decoded and output.

Thus, in a case where a transmit-data signal and control-data signal are transmitted at different powers with the conventional spread-spectrum signal receiver, power-ratio information is computed based upon symbol-rate information contained in the control data, the level of the transmit-data signal is changed based upon this information and then error-correction decoding processing is applied. With this method, however, a lengthy processing delay occurs by the time the power-ratio information is acquired. For example, with W-DCMA, the symbol-rate information is transmitted over one frame (10 ms), as mentioned earlier, and therefore a minimum of 10 ms is required to acquire the power-ratio information. Further, the symbol-rate information is encoded in order to improve its reliability, i.e., its reception characteristic, and therefore additional processing time is necessary to decode this information.

Information demanding delivery in real time, as in the case of voice communication, requires a short communication delay, i.e., a short processing time. Further, a short processing time is desirable also in interference suppression techniques, such as in an interference canceller. Also required is a circuit such as a memory for adding a processing delay onto the data channel. The result is an increase in the scale of the circuitry that is proportional to the amount of processing delay.

SUMMARY OF THE INVENTION

Accordingly, an object of the present invention is to shorten processing time for calculation of power ratio.

Another object of the present invention is to make it possible to decode transmit data and control data correctly even in a case where the transmission powers of the control data and transmit data are different.

A further object of the present invention is to make it possible to correctly generate a replica used in an interference canceller even in a case where the transmission powers of the control data and transmit data are different.

According to a first aspect of the present invention, the foregoing objects are attained by providing a spread-spectrum signal receiver for receiving a signal obtained by rendering transmit data and control data, which have been modulated at powers that differ from each other, into signals (mutually orthogonal signals) that do not influence each other, multiplexing these signals and transmitting the multiplexed signal from a transmit side, the apparatus comprising: (1) a despreader for despreading a receive signal to thereby demodulate a control-data signal and a transmit-data signal; (2) a channel estimation unit for deriving a channel estimation value from a pilot signal that is contained in the control-data signal; (3) a channel compensation unit for performing channel compensation of the transmit-data and control-data signals based upon the channel estimation value; (4) a power calculation unit for calculating power of the transmit-data signal and power of the control-data signal after the channel compensation and calculating a power ratio representing the ratio of the calculated power of the transmit-data signal to the calculated power of the control-data signal; (5) a signal-level changing unit for raising, on the basis of the power ratio, the level of whichever of the signals has the lower power; and (6) a decoder for executing decoding processing based upon the signal the level of which has been changed by the signal-level changing unit.

In accordance with the spread-spectrum signal receiver according to the first aspect of the invention, the power ratio is not derived based upon symbol-rate information contained in control data as in the prior art. Rather, the power ratio is calculated upon obtaining the power of the transmit-data signal and the power of the control-data signal. This makes it possible to shorten the processing time needed for calculating the power ratio. Further, the fact that processing time is shortened means that it is possible to reduce the scale of circuitry needed to add on a processing delay.

Further, in accordance with the spread-spectrum signal receiver according to the first aspect of the invention, the level of whichever signal has been reduced in power by having its signal level multiplied by $\beta$ on the transmit side is multiplied by 1/$\beta$ on the receive side, whereby the original level of the signal is restored. This is followed by the decoding of the signal. As a result, decoding can be performed correctly even though the transmission powers of the control data and transmit data differ.

The signal-level changing unit in the spread-spectrum signal receiver of the first aspect of the present invention raises the level of the transmit-data signal if the power ratio of transmit-data signal power to control-data signal power is less than 1 and raises the level of the control-data signal if the power ratio is greater than 1. As a result, even though the signal level of the transmit-data signal or of the control-data signal is lowered on the transmit side, whichever signal level has been lowered can be restored automatically and decoding processing can be executed correctly on the receive side.

According to a second aspect of the present invention, the foregoing objects are attained by providing a spread-spectrum signal receiver for receiving a signal obtained by rendering transmit data and control data, which have been modulated at powers that differ from each other, into signals that do not influence each other, multiplexing these signals and transmitting the multiplexed signal from a transmit side, the apparatus comprising: (1) a despreader for despreading a receive signal to thereby demodulate a control-data signal and a transmit-data signal; (2) a channel estimation unit for deriving a channel estimation value from a pilot signal that is contained in the control-data signal; (3) a channel compensation unit for performing channel compensation of the transmit-data and control-data signals based upon the channel estimation value; (4) a power calculation unit for calculating power of the transmit-data signal and power of the control-data signal after the channel compensation and calculating a power ratio representing the ratio of the calculated power of the transmit-data signal to the calculated power of the control-data signal; (5) a decision unit for raising, on the basis of the power ratio, the level of whichever of the signals has the lower power, leaving unchanged the level of whichever of the signals has the higher power, and outputting control data and transmit data upon rendering a hard decision or soft decision based upon the signals of the changed level and the unchanged level; (6) means for changing replica reliability RC1 of the transmit data and replica reliability RC2 of the control data based upon the power ratio; and (7) a first replica generator for generating a replica of transmit data on the transmit side by multiplying the transmit data, which is output from the decision unit, by the replica reliability RC1 conforming to the power ratio, and for generating a replica of control data on the transmit side by multiplying the control data, which is output from the decision unit, by the replica reliability RC2 conforming to the power ratio.

The spread-spectrum signal receiver according to the second aspect of the invention further comprises: means for changing replica reliability RC of the transmit signal based upon the power ratio; means for replicating the transmit signal by spreading the replicas of the transmit data and control data using spreading codes on the transmit side; and a second replica generator for generating a replica of the transmit signal by multiplying the replicated transmit signal by the replica reliability RC conforming to the power ratio.

Thus, the spread-spectrum signal receiver according to the second aspect of the present invention is so adapted that replica reliability is changed based upon the power ratio. More specifically, the higher the reception power, the higher the replica reliability is made. This makes it possible to raise the reliability of a generated replica. As a result, interference can be suppressed using each replica.

Other features and advantages of the present invention will be apparent from the following description taken in conjunction with the accompanying drawings, in which like reference characters designate the same or similar parts throughout the figures thereof.

Figure 1:
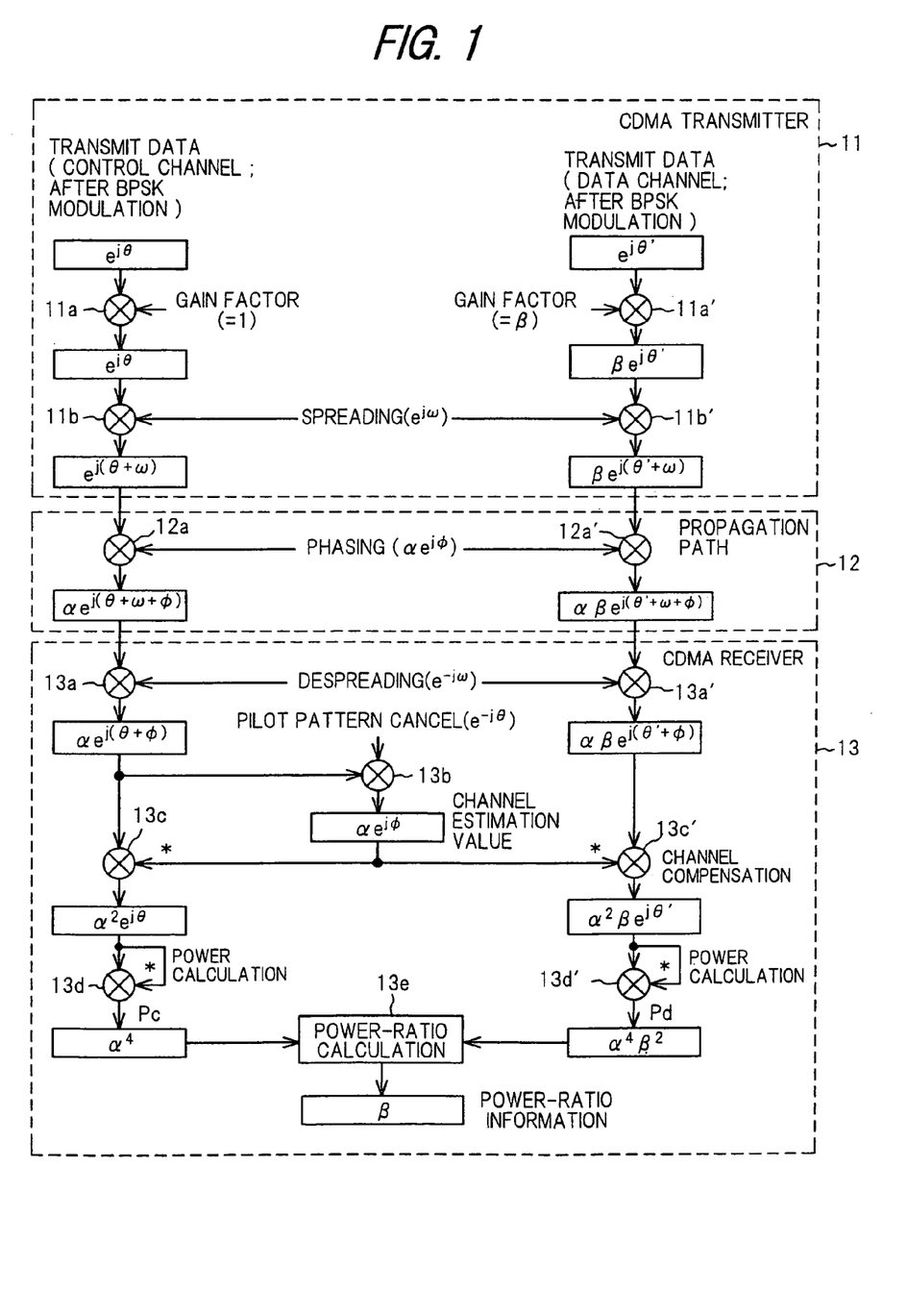
FIG. 1 illustrates the flow of processing for power-ratio calculation from transmission to reception according to the present invention.

DESCRIPTION OF THE PREFERRED EMBODIMENTS (A) Flow of Power-ratio Calculation from Transmission to Reception FIG. 1 illustrates the flow of processing for power-ratio calculation from transmission to reception according to the present invention. It is assumed here that the symbol rate of the data channel is lower than that of the control channel, i.e., that the process gain of the data channel is higher.

A CDMA transmitter 11 serving as an example of a spread-spectrum signal receiver includes a multiplier 11a for multiplying BPSK-modulated control data $e^{j\theta}$ by a gain factor (=1), and a spreader 11b for multiplying the output signal of the multiplier 11a by a spreading code $e^{j\omega}$ to generate a spread-spectrum modulated signal $e^{j(\theta+\omega)}$ and sending this modulated signal to a propagation path 12. The CDMA transmitter 11 further includes a multiplier 11a' for multiplying BPSK-modulated transmit data $e^{j\theta'}$ by a gain factor $\beta$ (<1), and a spreader 11b' for multiplying the output signal of the multiplier 11a' by the spreading code $e^{j\omega}$ to generate a spread-spectrum modulated signal $\beta e^{j(\theta'+\omega)}$ and sending this modulated signal to the propagation path 12.

The spread-spectrum modulated signals $e^{j(\theta+\omega)}$, $\beta e^{j(\theta'+\omega)}$ that have been sent to the propagation path 12 undergo phasing (amplitude fluctuation a and phase fluctuation $\phi$) and respectively become the signals $$\alpha e^{j(\theta+\omega+\phi)}, \alpha\beta e^{j(\theta'+\omega+\phi)}$$

These signals are received by a CDMA receiver 13. In FIG. 1, multipliers 12a, 12a' are provided for multiplying the spread-spectrum modulated signals $e^{j(\Theta+\omega)}$, $\beta e^{j(\Theta'+\omega)}$ by a phasing characteristic $\alpha e^{j\Phi}$ to thereby express the influence of phasing.

The CDMA receiver 13 includes a despreading modulator 13a for performing despreading using a code identical with the spreading code of the control data on the transmit side, and outputting a despread signal (control-data signal) $\alpha e^{j(\Theta+\Phi)}$, and a despreading modulator 13a' for performing despreading using a code identical with the spreading code of the transmit data on the transmit side, and outputting a despread signal (transmit-data signal) $\alpha\beta e^{j(\Theta'+\Phi)}$.

A multiplier 13b serving as a channel estimation unit multiplies the control-data signal $\alpha e^{j(\Theta+\Phi)}$ output from the despreading modulator 13a by an already known pilot cancel signal $e^{-j\Theta}$ to thereby calculate a channel estimation value $\alpha e^{j\Phi}$, and channel compensation units 13c, 13c' multiply the control-data signal $\alpha e^{j(\Theta+\Phi)}$ and transmit-data signal $\alpha\beta e^{j(\Theta'+\Phi)}$, respectively, by the complex-conjugate signal $\alpha e^{-j\Phi}$ of the channel estimation value to thereby perform phasing compensation and output $\alpha^2 e^{j\Theta}$, $\alpha^2\beta e^{j\Theta'}$, respectively.

A power calculation unit 13d multiplies the phasing-compensated control signal $\alpha^2 e^{j\Theta}$ by its complex-conjugate signal $\alpha^2 e^{-j\Theta}$ and outputs power $\alpha^4$ of the control signal. A power calculation unit 13d' multiplies the phasing-compensated control signal $\alpha^2\beta e^{j\Theta'}$ by its complex-conjugate signal $\alpha^2\beta e^{-j\Theta'}$ and outputs power $\alpha^4\beta^2$ of the data signal. A power-ratio calculation unit 13e calculates the ratio $\beta^2$ between data-signal power Pd and control-signal power Pc in accordance with the following equation:

$$\beta^2 = Pd/Pc$$

and outputs $\beta$.

In summary, the CDMA transmitter 11 spread-spectrum modulates control data and transmit data following the BPSK modulation thereof, and the spread-spectrum modulated signals sustain phasing in the propagation path 12 and then enter the CDMA receiver 13. The latter compensates for phasing by performing channel compensation processing using an estimation value calculated from the pilot signal included in the control-data signal and then calculates the power of the control-data signal and the power of the transmit-data signal and estimates the power ratio from these signal powers. The estimation of the power ratio does not require one frame of processing time, unlike the prior art. For example, if X symbols are used in order to improve estimation precision at a symbol rate of 15 kbps (10 bits/slot, i.e., 150 bits/frame), the processing time needed to estimate the power ratio is X/15 (ms). Thus, the processing time needed to calculate the power ratio can be shortened greatly. Further, the scale of circuitry needed to add on a delay can be reduced.

(B) First Embodiment

Figure 2:
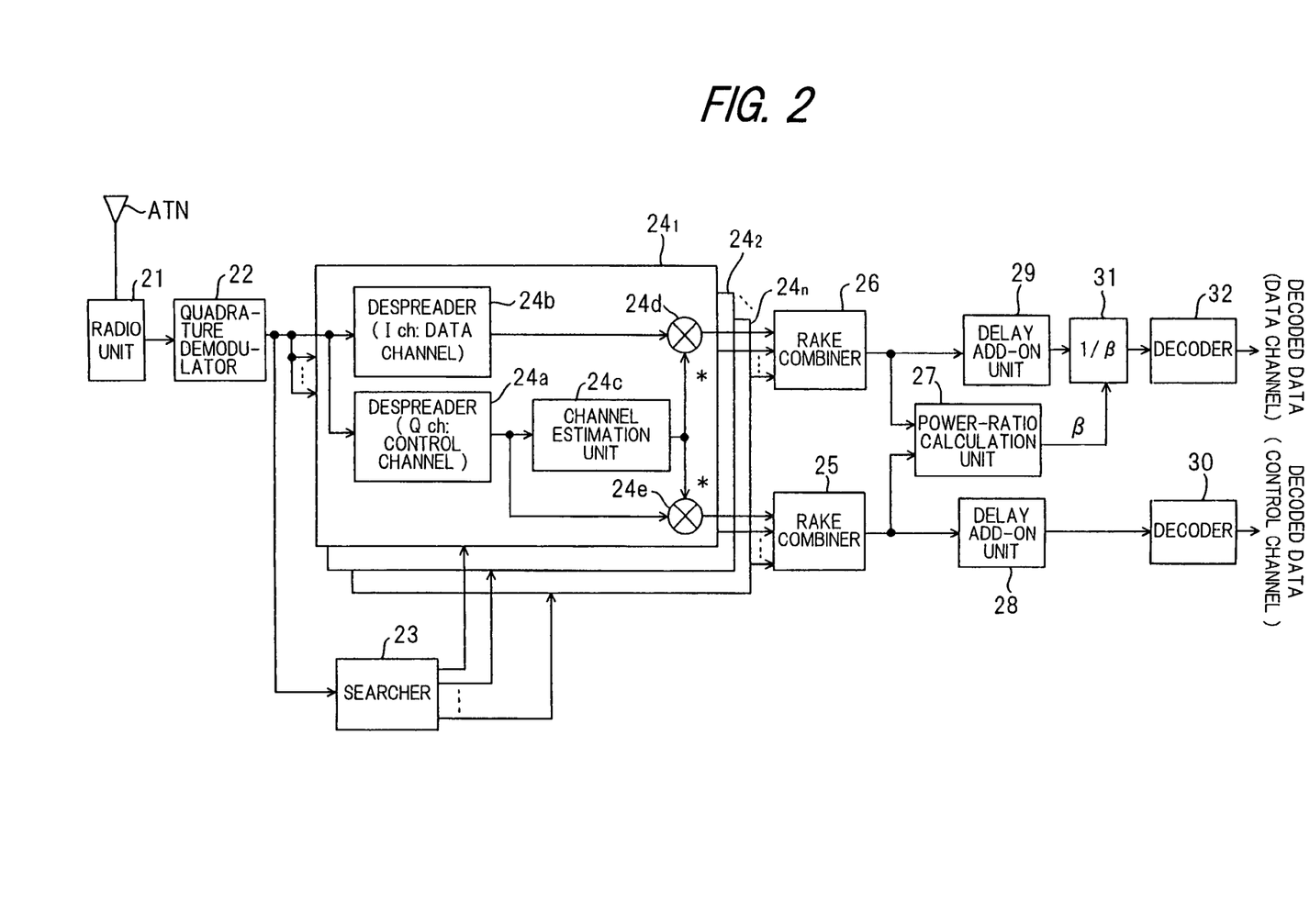
FIG. 2 is a block diagram of a CDMA receiver according to a first embodiment.

FIG. 2 is a block diagram illustrating one channel's worth of a CDMA receiver, which is a spread-spectrum signal transceiver according to the present invention. Here it is assumed that the symbol rate of the transmit data is lower than that of the control data. That is, it is assumed that data is transmitted upon making $\beta$ the gain factor of the transmit data and making 1 the gain factor of the control data.

The CDMA receiver includes a radio unit 21 for frequency-converting a high-frequency signal received from an antenna ATN to a baseband signal; a quadrature demodulator 22 for subjecting the baseband signal to quadrature detection, converting the analog in-phase component (I component) and analog quadrature component (Q component) to digital data and inputting the data to a searcher 23 and fingers $24_1 \sim 24_n$. Upon receiving input of a direct-sequence signal (DS signal) that has been influenced by the multipath effect, the searcher 23 detects multipath interference by performing an autocorrelation operation using a matched filter and inputs despreading-start timing data and delay-time adjustment data of each path to the fingers $24_1 \sim 24_n$.

A control-channel despreader 24a of each of the fingers $24_1 \sim 24_n$ subjects a direct wave or delayed wave that arrives via a prescribed path to despread processing using a code identical with the transmit-side spreading code for the control channel and outputs a control-data signal. A data-channel despreader 24b subjects a direct wave or delayed wave that arrives via a prescribed path to despread processing using a code identical with the spreading code for the data channel and outputs a transmit-data signal. A channel estimation unit 24c performs channel estimation using the pilot signal contained in the despread control-data signal and outputs a channel estimation signal. Channel compensation units 24d, 24e multiply the despread control-data signal and despread transmit-data signal by the complex-conjugate signal of the channel estimation signal to thereby compensate for phasing.

A RAKE combiner 25 combines the control-data signals output from the fingers $24_1 \sim 24_n$ and outputs the result as a soft-decision data sequence. A RAKE combiner 26 combines the transmit-data signals output from the fingers $24_1 \sim 24_n$ and outputs the result as a soft-decision data sequence. A power-ratio calculation unit 27 (1) calculates the power Pc of the control-data signal by multiplying the control-data signal output from the RAKE combiner 25 by the complex-conjugate signal of this control-data signal, (2) calculates the power Pd of the transmit-data signal by multiplying the transmit-data signal output from the RAKE combiner 26 by the complex-conjugate signal of this transmit-data signal, and (3) calculates the ratio $\beta^2$ (=Pd/Pc) between these powers and outputs $\beta$.

Delay add-on units 28, 29 delay, by a length of time needed for the calculation of the power ratio, the soft-decision data sequence of the control data and the soft-decision data sequence of the transmit data output from the RAKE combiners 25, 26, respectively. A decoder 30 applies soft-decision error-correction decoding processing to the soft-decision data sequence, which is output from the delay add-on unit 28, decodes the control data and outputs the decoded data.

A signal-level changing unit 31 multiplies the level of the soft-decision data sequence output from the delay add-on unit 29 by $1/\beta$, thereby restoring the level of the transmit data that was multiplied by $\beta$ on the transmit side. A decoder 32 thenceforth applies soft-decision error-correction decoding processing to the soft-decision data sequence, which is output from the signal-level changing unit 31, decodes the transmit data and outputs the decoded data.

Though the soft-decision data sequences are input to the decoders 30, 32 in the arrangement described above, hard-decision units can be provided in front of the decoders 30, 32 and hard-decision data sequences can be input to the decoders.

In accordance with the first embodiment, rather than the power ratio being calculated based upon symbol-rate information contained in control data, as in the prior art, the power ratio is calculated by finding the power of the transmit-data signal and the power of the control-data signal. This makes it possible to shorten the processing time needed for calculation of the power ratio. Further, shortening the processing time makes it possible to reduce the scale of the circuitry constituting the delay add-on units 28, 29 which add on the processing delay time. Further, in accordance with the first embodiment, the level of whichever signal has been reduced in power by having its signal level multiplied by $\beta$ on the transmit side is multiplied by $1/\beta$ on the receive side, whereby the original level of the signal is restored. This is followed by the decoding of the signal. As a result, decoding can be performed correctly even though the transmission powers of the control data and transmit data differ.

(C) Second Embodiment

In the first embodiment, it is assumed that the symbol rate of the transmit data is lower than that of the control data, and the gain factors of the transmit data and control data are made $\beta$ (<1) and 1, respectively, on the transmit side. However, the symbol rate of the transmit data is higher or lower than that of the control data depending upon whether the transmit data is voice data or image data, etc. In other words, there are instances where the gain factor of the transmit data is $\beta$ and cases where the gain factor of the control data is $\beta$. In such case, the second embodiment determines which gain factor, i.e., the gain factor of the control data or the gain factor of the transmit data, is $\beta$ and which is 1, changes the level according and then executes decoding processing.

Figure 3:
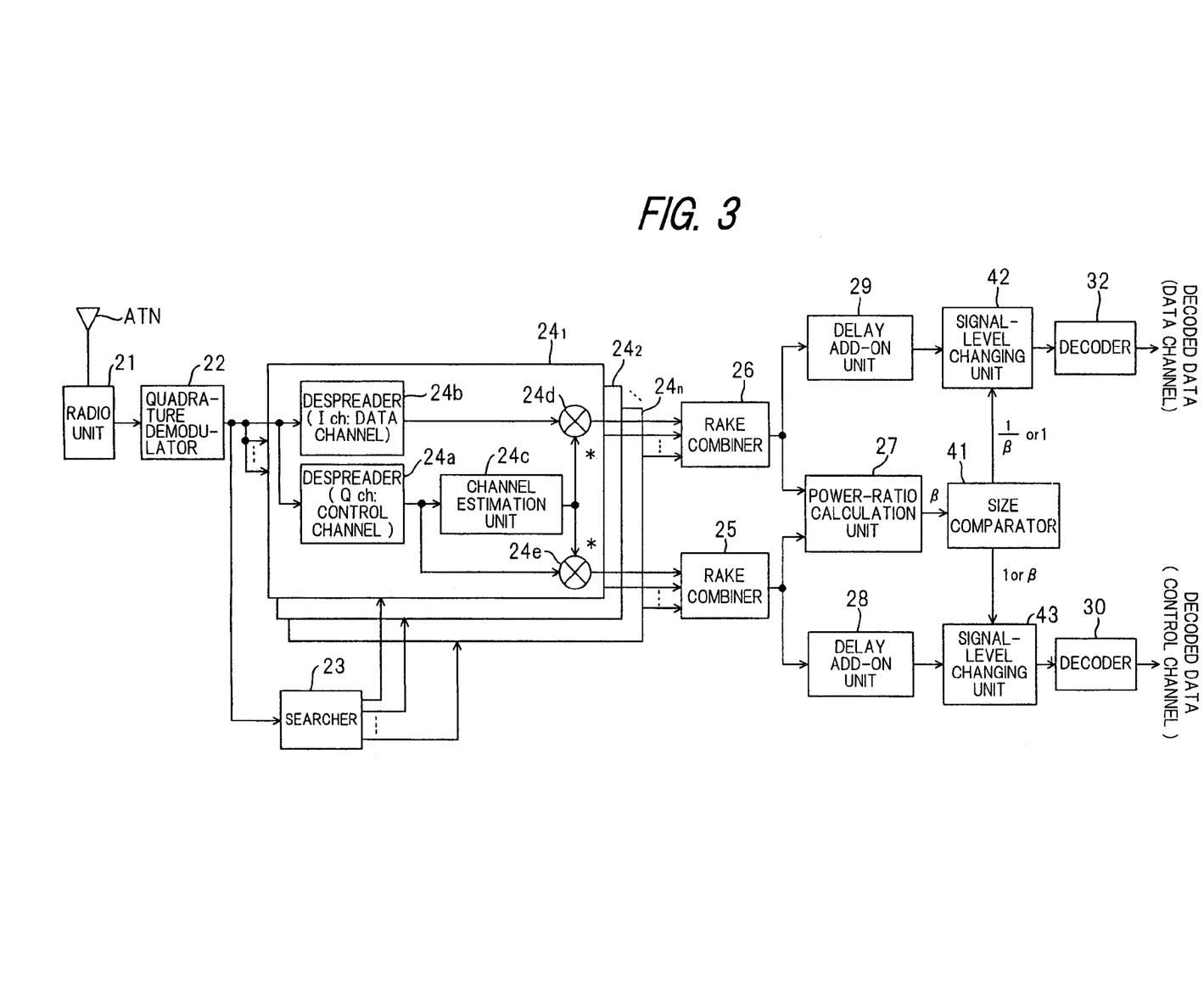
FIG. 3 is a block diagram of a CDMA receiver according to a second embodiment.

FIG. 3 is a block diagram illustrating a CDMA receiver according to the second embodiment. Components in FIG. 3 identical with those of the first embodiment are designated by like reference characters. The second embodiment differs from the first embodiment in the following respects:

(1) a size comparator 41 is provided for determining whether the power ratio ($\beta^2$=Pd/Pc) is larger or smaller than 1;

(2) a signal-level changing unit 42 is provided for multiplying the level of the soft-decision transmit data sequence output from the delay add-on unit 29 by $1/\beta$ if the power ratio is smaller than 1 and Pd<Pc holds, and for multiplying the level of the soft-decision transmit data sequence output from the delay add-on unit 29 by 1 if the power ratio is larger than 1 and Pd>Pc holds; and (3) a signal-level changing unit 44 is provided for multiplying the level of the soft-decision transmit data sequence output from the delay add-on unit 28 by $\beta$ if the power ratio is larger than 1 and Pd>Pc holds, and for multiplying the level of the soft-decision transmit data sequence output from the delay add-on unit 28 by 1 if the power ratio is smaller than 1 and Pd<Pc holds.

In accordance with the second embodiment, even though power is reduced on the transmit side by multiplying the level of the control data or transmit data by $\beta$, the level of the signal that has been reduced in power is multiplied by $1/\beta$ on the receive side, whereby the original level of the signal is restored. This is followed by the decoding of the signal. As a result, decoding can be performed correctly even though the transmission powers of the control data and transmit data differ.

(D) Third Embodiment

In spread-spectrum communications, e.g., spread-spectrum communications based upon W-CDMA, interference between channels caused by non-linearity between spreading codes is a major factor that limits system capacity. In particular, since heavy interference from high-speed channels such as for transmitting moving images puts pressure on the capacity of low-speed channels, how to suppress such interference is a major challenge insofar as assuring the capacity of low-speed channels is concerned. An interference canceller is a device which suppresses interference by generating a replica of an interference signal using the results of demodulation of each receive channel and subtracting the replica from the receive signal.

Figure 4:
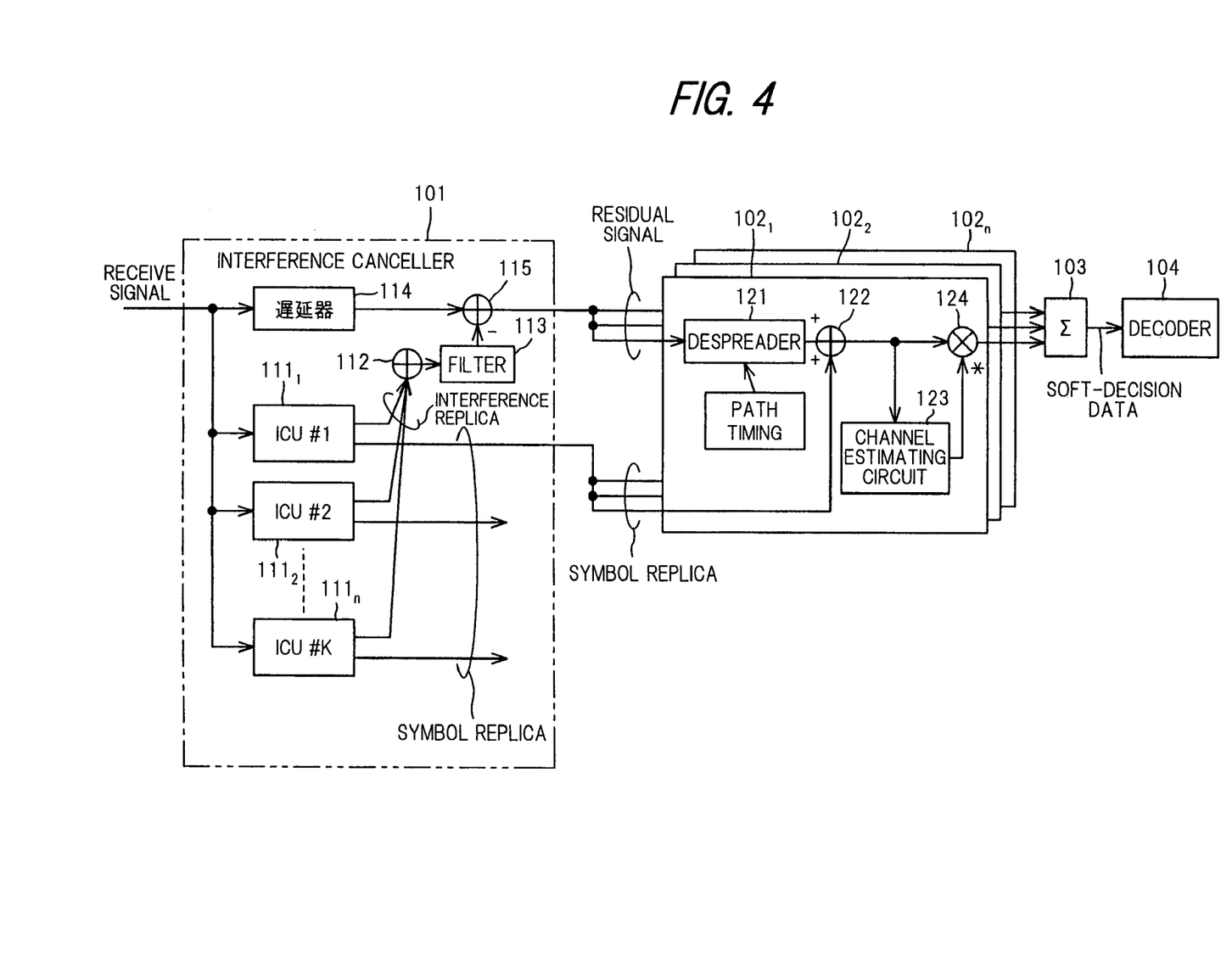
FIG. 4 is a block diagram of a receiver having an interference canceller according to a third embodiment.

FIG. 4 is block diagram illustrating one channel's worth of a CDMA receiver having an interference canceller. Specifically, the receiver includes an interference canceller 101, fingers $102_1$, to $102_n$, a RAKE combiner 103 and a decoder 104. The interference canceller 101 includes interference cancellation units (ICU) $111_n \sim 111_n$, which are provided for respective ones of receive channels, for generating and outputting interference replicas of the chip rates of the channels based upon the receive signals; a combiner 112 for combining the interference replica signals of the respective channels; a filter 113 for limiting the band of the combined interference replica signals; a delay unit 114 for delaying the receive signal for a length of time required for generation of an interference replica; and a subtractor 115 for executing interference suppression by subtracting the combined interference replica from the receive signal, thereby producing a residual signal.

The interference cancellation units $111_n \sim 111_n$ of the respective channels generate interference replicas and produce replicates (replicates of control data and replicates of transmit data) of the transmit signal having the symbol rate. These replicates are referred to as symbol replicas. The interference cancellation units $111_n \sim 111_n$ are connected in parallel and shorten processing time by processing all channels simultaneously.

Each of the fingers $102_1 \sim 102_n$ has a despreader 121 for executing despread processing in sync with path timing, which enters from a searcher (not shown), thereby outputting a despread signal of the residual signal that has undergone interference cancellation; a combiner 122 for adding the symbol replica to the despread signal; a channel estimating circuit 123 for estimating a channel characteristic; and a channel compensation unit 124 for eliminating phasing by applying channel compensation processing to the output signal of the combiner 122 using the channel estimation signal. The RAKE combiner 103 combines the channel-compensated signals output from the fingers, generates soft-decision data and inputs the soft-decision data to the decoder 104.

Figure 5:
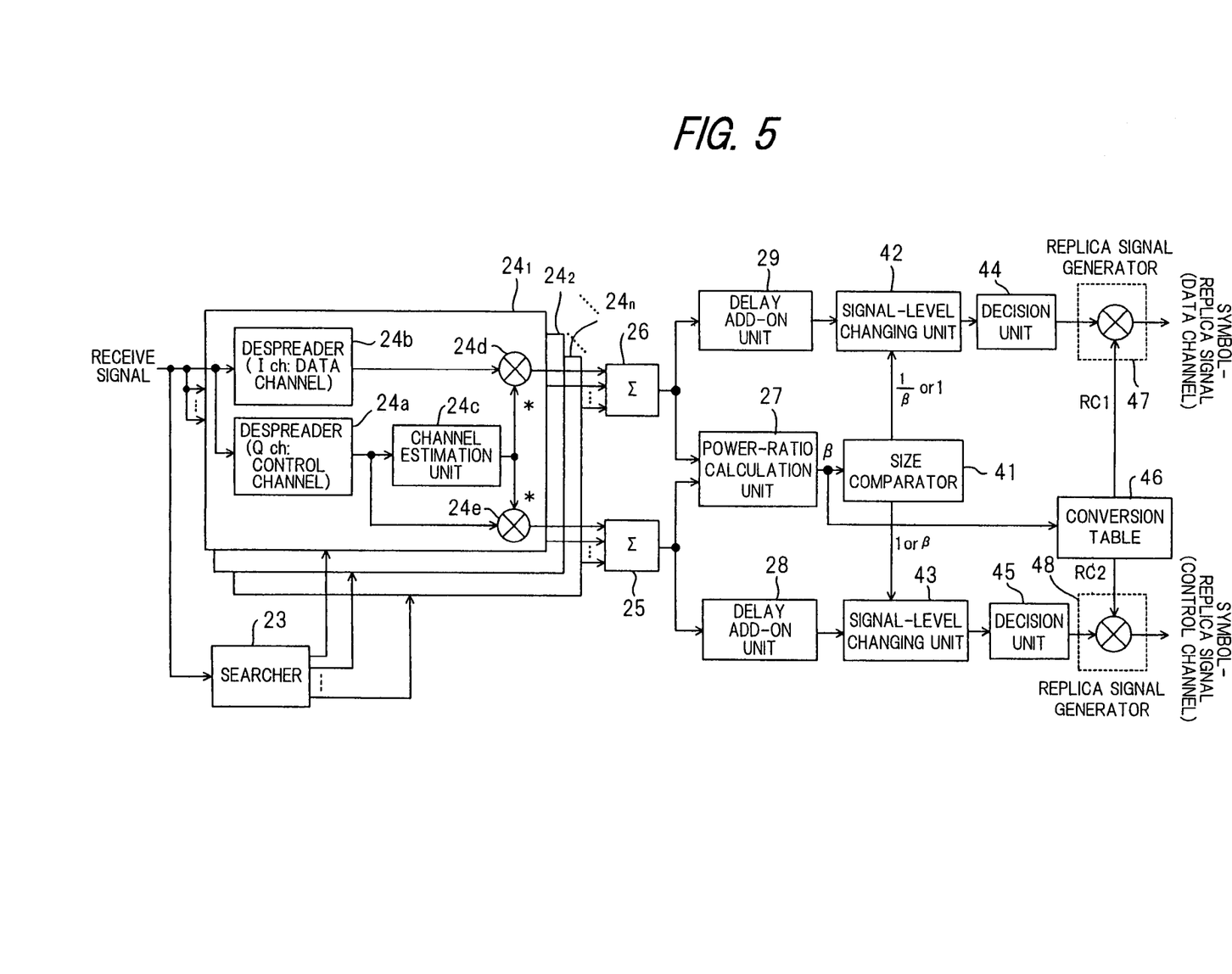
FIG. 5 is a block diagram of a symbol replica generator according to the third embodiment.

FIG. 5 is a block diagram illustrating a symbol replica generator in an interference cancellation unit for generating replica signals of control data and transmit data from a receive signal. The symbol replica generator is particularly applicable to a case where control data and transmit data has been transmitted at different powers. The symbol replica generator has a structure similar to that of the CDMA receiver of the second embodiment and components thereof identical with those of this CDMA receiver are designated by like reference characters.

The symbol replica generator differs from the CDMA receiver of the second embodiment in the following respects:

(1) a decision unit 44 is provided at the output of the signal-level changing unit 42 for rendering a hard decision based upon the signal level and outputting a hard-decision transmit data sequence;

(2) a decision unit 45 is provided at the output of the signal-level changing unit 43 for rendering a hard decision based upon the signal level and outputting a hard-decision transmit data sequence;

(3) means (a conversion table) 46 is provided for changing replica reliability RC1 of the transmit data and replica reliability RC2 of the control data based upon the power ratio;

(4) a symbol replica signal generator 47 is provided for generating a replica of transmit data on the transmit side by multiplying the hard-decision transmit data sequence output from the decision unit 44 by the replica reliability RC1 conforming to the power ratio; and (5) a symbol replica signal generator 48 is provided for generating a replica of control data on the transmit side by multiplying the hard-decision transmit data sequence output from the decision unit 45 by the replica reliability RC2 conforming to the power ratio.

Figure 6:
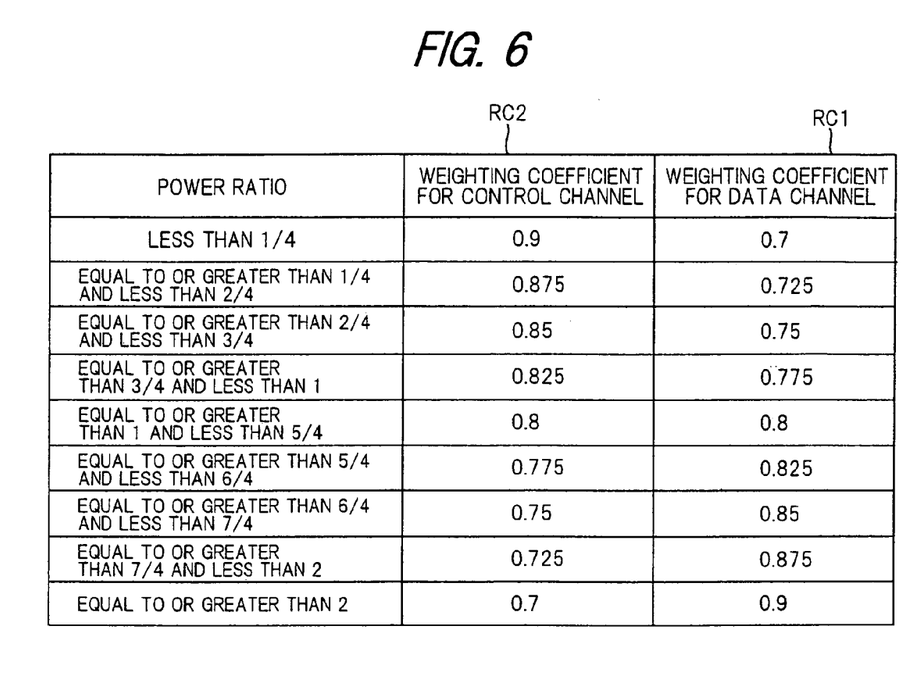
FIG. 6 illustrates an example of a conversion table according to the third embodiment.

FIG. 6 illustrates an example of the conversion table 46. The table stores a weighting coefficient (reliability RC1) for the data channel and a weighting coefficient (reliability RC2) for the control channel in association with each power ratio [=(power Pd of the transmit-data signal)/(power Pc of the control-data signal)]. Because reliability increases with an increase in signal power, a larger weighting coefficient is used. In a case where the power ratio (=Pd/Pc) is less than 1, the signal power of the control channel is larger than that of the transmit data. Accordingly, the weighting coefficient RC2 of the control channel is increased and the weighting coefficient RC1 of the data channel is decreased. Conversely, if the power ratio (=Pd/Pc) is greater than 1, the signal power of the control channel is less than that of the transmit data. Accordingly, the weighting coefficient RC2 of the control channel is decreased and the weighting coefficient RC1 of the data channel is increased.

Thus, in accordance with the third embodiment, replica reliability is changed based upon the power ratio. In other words, the higher the reception power, the greater the replica reliability is made. This makes it possible to improve the reliability of the symbol replica generated.

(E) Fourth Embodiment

Figure 7:
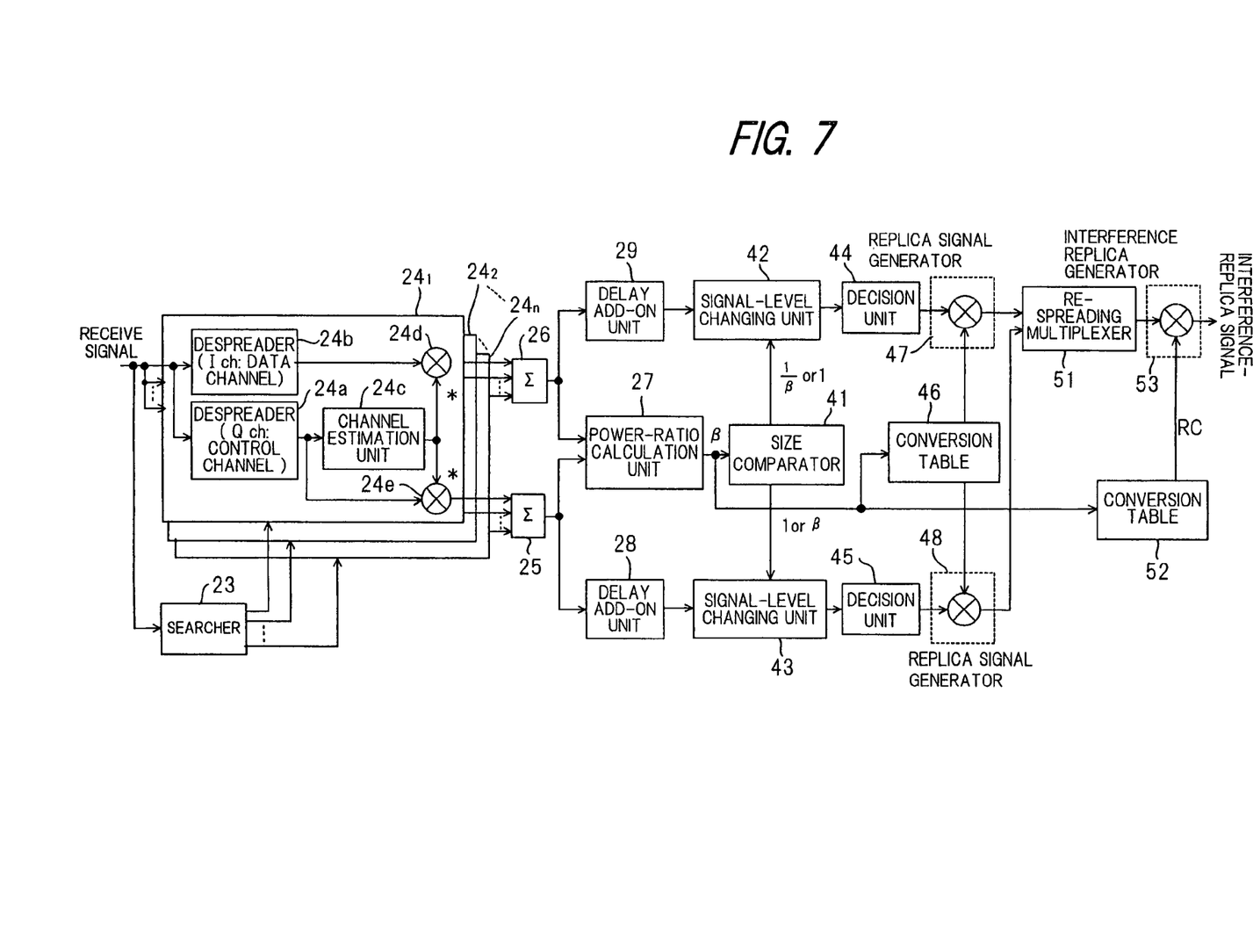
FIG. 7 is a block diagram of an interference replica generator according to a fourth embodiment.

FIG. 7 is a block diagram illustrating an interference replica generator in an interference cancellation unit for generating an interference replica from a receive signal. The interference replica generator is particularly applicable to a case where control data and transmit data has been transmitted at different powers. Components in FIG. 7 identical with those of the third embodiment of FIG. 5 are designated by like reference characters. The interference replica generator of the fourth embodiment differs from the replica generator of the third embodiment in the following respects:

(1) a re-spreading multiplexer 51 is provided for spreading replicas of the control data and transmit data using respective ones of transmit-side spreading codes, and mapping the replicas as I- and Q-channel components of an I-Q complex plane to thereby perform multiplexing and replicate the transmit signal;

(2) means (a second conversion table) 52 is provided for changing replica reliability RC of the transmit signal based upon the power ratio; and (3) an interference replica generator 53 is provided for generating a replica of the transmit signal by multiplying the replicated transmit signal by the replica reliability RC that conforms to the power ratio.

Figure 8:
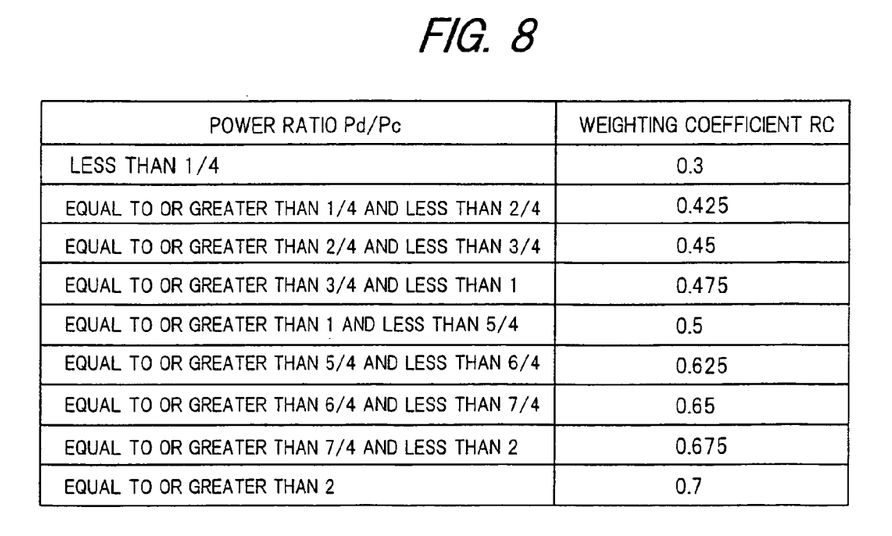
FIG. 8 illustrates an example of a second conversion table according to the fourth embodiment.

FIG. 8 illustrates an example of the second conversion table 52. The table stores a weighting coefficient (reliability RC) for the transmit signal in association with each power ratio [=(power Pd of the transmit-data signal)/(power Pc of the control-data signal)]. The replica reliability RC is reduced if the power ratio is small and is increases if the power ratio is large. The reason for this will now be described.

Since the symbol rate is fixed at 15 kbps on the control channel, the spreading factor is fixed for this channel. However, since the symbol rate on the data channel varies, so does the spreading factor. If the symbol rate is high and the spreading factor is low, gain (process gain) due to spreading will be low. As a consequence, it is necessary for the quality of the data channel to be maintained on at the same level as that of control channel. Gain factor is used to control this.

If the spreading factor of the data channel is low, the power at the end of the transmit antenna must be increased. This is for the purpose of maintaining the same quality even though the spreading factor varies. In particular, a low spreading factor on the data channel means that the symbol rate is high and that data such as image data is being transmitted rather than voice. In general, data such as image data requires a higher communication quality than voice data. If the spreading factor of the data channel is low, therefore, the power at the transmit antenna is raised. Thus, when the spreading factor of the data channel is low (power ratio=Pd/Pc>1), transmission power, i.e., reception power, is higher than when the spreading factor of the data channel is high (power ratio=Pd/Pc<1). In the second conversion table 52, therefore, the larger the power ratio (=Pd/Pc), the larger the reliability RC is made; the smaller the power ratio (=Pd/Pc), the smaller the reliability RC is made.

Thus, in accordance with the fourth embodiment, replica reliability is changed based upon the power ratio. More specifically, the higher the reception power, the higher the replica reliability is made. This makes it possible to raise the reliability of a generated replica.

Thus, in accordance with the present invention, the power ratio is not deduced based upon rate information contained in control data as in the prior art. Rather, the power ratio is calculated upon obtaining the power of the transmit-data signal and the power of the control-data signal. This makes it possible to shorten the processing time needed for calculating the power ratio. Further, the fact that processing time is shortened means that it is possible to reduce the scale of circuitry needed to add on a processing delay.

Further, in accordance with the present invention, the level of whichever signal has been reduced in power by having its signal level multiplied by $\beta$ on the transmit side is multiplied by $1/\beta$ on the receive side, whereby the original level of the signal is restored. This is followed by the decoding of the signal. As a result, decoding can be performed correctly even though the transmission powers of the control data and transmit data differ.

Further, in accordance with the present invention, the level of the transmit-data signal is raised if the power ratio (=Pd/Pc) of transmit-data signal power Pd to control-data signal power Pc is less than 1 and the level of the control-data signal is raised if the power ratio is greater than 1. As a result, even though the signal level of the transmit-data signal or of the control-data signal is lowered on the transmit side, whichever signal level has been lowered can be restored automatically and decoding processing can be executed correctly on the receive side.

Further, in accordance with the present invention, replica reliability is changed based upon the power ratio. More specifically, the higher the reception power, the higher the replica reliability is made. This makes it possible to raise the reliability of a generated symbol replica and the reliability of an interference replica.

As many apparently widely different embodiments of the present invention can be made without departing from the spirit and scope thereof, it is to be understood that the invention is not limited to the specific embodiments thereof except as defined in the appended claims.

What is claimed is:

1. A spread-spectrum signal receiver for receiving a signal obtained by rendering transmit data and control data, which have been modulated at powers that differ from each other, into signals that do not influence each other, multiplexing these signals and transmitting the multiplexed signal, the apparatus comprising:

a despreader for despreading a receive signal to thereby demodulate a control-data signal and a transmit-data signal;

a channel estimation unit for deriving a channel estimation value from a pilot signal that is contained in the control-data signal;

a channel compensation unit for performing channel compensation of the transmit-data and control-data signals based upon the channel estimation a power calculation unit for calculating power of the transmit-data signal and power of the control-data signal after the channel compensation thereof and calculating a power ratio representing the ratio of the calculated power of the transmit-data signal to the calculated power of the control-data signal;

a signal-level changing unit for raising, on the basis of the power ratio, the level of whichever of the signals has the lower power; and a decoder for executing decoding processing based upon the signal the level of which has been changed by said signal-level changing unit.

2. The receiver according to claim 1, wherein said signal-level changing unit raises the level of the transmit-data signal if the power ratio of transmit-data signal power to control-data signal power its less than 1 and raises the level of the control-data signal if the power ratio is greater than 1.

3. A spread-spectrum signal receiver for receiving a transmit signal obtained by rendering transmit data and control data, which have been modulated at powers that differ from each other, into signals that do not influence each other and multiplexing these signals, the apparatus comprising:

a despreader for despreading a receive signal to thereby demodulate a control-data signal and a transmit-data signal;

a channel estimation unit for deriving a channel estimation value from a pilot signal that is contained in the control-data signal;

a channel compensation unit for performing channel compensation of the transmit-data and control-data signals based upon the channel estimation value;

a power calculation unit for calculating power of the transmit-data signal and power of the control-data signal after the channel compensation thereof and calculating a power ratio representing the ratio of the calculated power of the transmit-data signal to the calculated power of the control-data signal;

a decision unit for raising, on the basis of the power ratio, the level of whichever of the signals has the lower power, leaving unchanged the level of whichever of the signals has the higher power, and outputting control data and transmit data upon rendering a hard decision or soft decision based upon the signals of the changed level and the unchanged level;

means for changing replica reliability (RC1) of the transmit data and replica reliability (RC2) of the control data based upon the power ratio; and a first replica generator for generating a replica of transmit data on the transmit side by multiplying the transmit data, which is output from said decision unit, by the replica reliability (RC1) conforming to the power ratio, and for generating a replica of control data on the transmit side by multiplying the control data, which is output from said decision unit, by the replica reliability (RC2) conforming to the power ratio.

4. The apparatus according to claim 3, further comprising:

means for changing replica reliability (RC) of the transmit signal based upon the power ratio;

means for replicating the transmit signal by spreading the replicas of the transmit data and control data using spreading codes on the transmit side; and a second replica generator for generating a replica of the transmit signal by multiplying the replicated transmit signal by the replica reliability (RC) conforming to the power ratio.

* * * * *